United States Patent
Ohnemus

(10) Patent No.: US 10,738,835 B2
(45) Date of Patent: Aug. 11, 2020

(54) DRIVE UNIT FOR A MOTOR VEHICLE, IN PARTICULAR A PASSENGER CAR

(71) Applicant: Bayerische Motoren Werke Aktiengesellschaft, Munich (DE)

(72) Inventor: Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 294 days.

(21) Appl. No.: 15/709,623

(22) Filed: Sep. 20, 2017

(65) Prior Publication Data
US 2018/0010647 A1    Jan. 11, 2018

Related U.S. Application Data

(63) Continuation of application No. PCT/EP2016/063420, filed on Jun. 13, 2016.

(30) Foreign Application Priority Data

Jun. 18, 2015   (DE) .................. 10 2015 211 277

(51) Int. Cl.
*F16D 3/72*      (2006.01)
*B60K 6/40*      (2007.10)
(Continued)

(52) U.S. Cl.
CPC ............. *F16D 3/72* (2013.01); *B60K 6/40* (2013.01); *B60K 6/405* (2013.01); *B60K 6/48* (2013.01);
(Continued)

(58) Field of Classification Search
CPC ... F16D 3/72; F16D 3/005; F16D 3/02; B60K 6/405; B60K 6/485; B60K 6/48;
(Continued)

(56) References Cited

U.S. PATENT DOCUMENTS 3,903,982 A * 9/1975 Van Winsen .......... B60K 17/22
                                                          464/79
6,437,467 B1* 8/2002 Schierling ............... F02N 11/04
(Continued)

FOREIGN PATENT DOCUMENTS

CN      103118887 A     5/2013
CN      103481881 A     1/2014
(Continued)

OTHER PUBLICATIONS

International Search Report (PCT/ISA/210) issued in PCT Application No. PCT/EP2016/063420 dated Sep. 1, 2016 with English translation (Four (4) pages).
(Continued)

*Primary Examiner* — Greg Binda
(74) *Attorney, Agent, or Firm* — Crowell & Moring LLP

(57) ABSTRACT

A drive unit is provided for a motor vehicle, including an internal combustion engine with an output shaft, a starting element that can be driven by the output shaft, a transmission that can be driven by the output shaft via the starting element, and a bellows mechanism via which the starting element can be driven by the output shaft. The bellows is configured as a folding bellows with a plurality of walls overlapping each other in the axial direction, such that the bellows can be pulled apart and compressed again without the bellows being damaged or deformed plastically as a result. The bellows is utilized as a balancing clutch, via which the starting element is coupled to the output shaft, such that torques are transmitted via the bellows between the starting element and the output shaft.

15 Claims, 2 Drawing Sheets

(51) Int. Cl.
*B60K 6/485* (2007.10)
*F16D 3/00* (2006.01)
*B60K 6/405* (2007.10)
*B60K 6/48* (2007.10)

(52) U.S. Cl.
CPC .............. *B60K 6/485* (2013.01); *F16D 3/005* (2013.01); *B60Y 2200/92* (2013.01); *Y10T 74/134* (2015.01)

(58) Field of Classification Search
CPC ...... B60K 6/40; B60K 2006/268; B60K 7/00; B60K 6/26; Y10T 74/134; B60Y 2200/92
USPC ............ 464/79; 192/3.32; 180/65.25; 74/7 C
See application file for complete search history.

(56) References Cited

U.S. PATENT DOCUMENTS

| | | | |
|---|---|---|---|
| 6,726,569 B1 * | 4/2004 | Seidl | ................. B60K 6/485 |
| 2005/0150734 A1 | 7/2005 | Breier et al. | |
| 2013/0291374 A1 | 11/2013 | Ohnemus et al. | |
| 2013/0327605 A1 | 12/2013 | Bachmaier et al. | |
| 2014/0041483 A1 | 2/2014 | Glassner et al. | |

FOREIGN PATENT DOCUMENTS

| | | | |
|---|---|---|---|
| CN | 103568813 A | | 2/2014 |
| DE | 101 21 917 A1 | * | 11/2001 |
| DE | 10 2009 042 809 A1 | | 5/2010 |
| DE | 10 2013 011 900 A1 | | 1/2015 |
| DE | 10 2014 011 994 A1 | | 2/2016 |
| EP | 1 279 828 A1 | | 1/2003 |
| WO | WO 03/081064 A1 | | 10/2003 |

OTHER PUBLICATIONS

German-language Search Report issued in counterpart German Application No. 10 2015 211 277.2 dated Mar. 14, 2016 with partial English translation (Twelve (12) pages).
Chinese-language Office Action issued in counterpart Chinese Application No. 201680014453.7 dated Jan. 24, 2019 with English translation (14 pages).

* cited by examiner

DRIVE UNIT FOR A MOTOR VEHICLE, IN PARTICULAR A PASSENGER CAR

CROSS REFERENCE TO RELATED APPLICATIONS

This application is a continuation of PCT International Application No. PCT/EP2016/063420, filed Jun. 13, 2016, which claims priority under 35 U.S.C. § 119 from German Patent Application No. 10 2015 211 277.2, filed Jun. 18, 2015, the entire disclosures of which are herein expressly incorporated by reference.

BACKGROUND AND SUMMARY OF THE INVENTION

The invention relates to a drive unit for a motor vehicle, in particular a passenger car.

Drive units of this type for motor vehicles, in particular passenger cars, are already well known from the general prior art and, in particular, from series vehicle production. A drive unit of this type includes at least one internal combustion engine which has an output shaft. Via the output shaft, the internal combustion engine provides torques, for example, by way of which the motor vehicle can be driven. The internal combustion engine is configured, for example, as a reciprocating piston internal combustion engine, the output shaft being a crankshaft of the internal combustion engine.

Furthermore, the drive unit includes a starting element which can be driven by the output shaft, and a transmission which can be driven by the output shaft via the starting element. The starting element is, for example, a clutch, in particular a wet or dry clutch, or else a torque converter, in particular a hydrodynamic torque converter which can be configured, for example, as a trilock converter. The transmission can be configured, for example, as a manual transmission, in particular a manual gearbox, as an automated manual gearbox or as an automatic transmission, the automatic transmission being based, for example, on a planetary transmission. Furthermore, the transmission can be configured as a double clutch transmission, a continuously variable transmission or another transmission.

The output shaft is usually mounted on a housing of the internal combustion engine such that it can be rotated about a rotational axis relative to the housing. Bearings are provided to this end which are also denoted as main bearings in the case of the crankshaft. The main bearings are usually arranged so as to follow one another in the axial direction of the output shaft or behind one another, that main bearing which is arranged closest to the starting element in the axial direction of the output shaft usually being called the last main bearing. Higher loads of the output shaft can usually occur, in particular, in the region of the last main bearing.

It is therefore an object of the present invention to further develop a drive device of the type mentioned at the outset, in such a way that the loads which act on the output shaft can be kept particularly low.

According to the invention, said object is achieved by way of a drive unit according to embodiments of the invention.

The drive unit according to the invention is distinguished by the fact that at least one bellows is provided, via which the starting element can be driven by the output shaft. A bellows of this type is configured in the manner of a folding bellows, since it has a plurality of walls or wall regions which are arranged in a mutual overlap in the axial direction, with the result that the bellows can be pulled apart, for example in the manner of an accordion, and can be extended as a result, and thereupon can be compressed again or shortened, without the bellows being damaged or deformed plastically as a result. The concept on which the invention is based is to utilize the bellows as a balancing clutch, via which the starting element is coupled or can be coupled to the output shaft, with the result that torques can be transmitted via the bellows between the starting element and the output shaft. Loads which act on the output shaft during the operation of the internal combustion engine can be kept particularly low by way of the utilization of the bellows, in particular when an electric machine which is, for example, coaxial or is arranged coaxially with respect to the output shaft is arranged or is to be arranged between the internal combustion engine, the starting element and the transmission.

At the same time, it is possible to transmit torques which are provided by the internal combustion engine via the output shaft to the starting element, in particular its input side, via the bellows which acts as a bellow coupling, for example in a manner which is at least substantially unfiltered and is as torsionally rigid as possible, in order to drive the starting element as a result. Furthermore, it is possible by way of the use of the bellows to compensate for axial and radial movements or oblique positions of the starting element with respect to the output shaft, with the result that excessive loads of the output shaft can be avoided. This is possible, in particular, even when the starting element is at a great axial spacing from the output shaft.

In order to keep the loads which act on the output shaft particularly low and at the same time to realize a particularly effective and efficient transmission of torques between the starting element and the output shaft, it is provided in one advantageous embodiment of the invention that the bellows is formed from a metallic material. In other words, it is preferably provided that the bellows is configured as a metal bellows. The bellows is therefore configured, for example, in the manner of a folding bellows, but the bellows is not produced from rubber or an elastomer, but rather from a metallic material. The bellows then acts as a metal bellows clutch, with the result that torques can be transmitted particularly satisfactorily.

In a further refinement of the invention, a drive device which is different from the internal combustion engine is provided, by means of which drive device the starting element can be driven, in particular via the at least one bellows, and the output shaft can be driven. The drive device is, for example, a starter, by way of which the internal combustion engine can be cranked, that is to say can be started, with driving of the output shaft. In the case of the use of a drive device of this type, in particular, the spacing which runs in the axial direction of the output shaft between the output shaft and the starting element is particularly great, it being possible for projecting masses to usually occur on account of said great spacing and for an eccentricity to occur on account of any oblique position of the output shaft, in particular in the region of its last main bearing, which can lead at rotational speeds to a not inconsiderable transverse force. Said excessive transverse force and resulting, excessive loads can then also be avoided by means of the bellows in the case of the use of the drive device.

The drive device is, for example, an electric machine which can be arranged, in particular, coaxially with respect to the output shaft. Here, the respective axial directions of the output shaft and the electric machine run in the vehicle longitudinal direction. Here, for example, the electric machine is a crankshaft starter generator, by means of which the output shaft can be driven, and which can be driven by the output shaft. Furthermore, a drive device is also contemplated which permits a position of the electric machine which is axially parallel to the output shaft or crankshaft via a transverse drive as spur gear or, for example, a wraparound transmission via a belt or ladder chain. In addition to said drive device, there might also be any desired auxiliary device, for example a refrigerant compressor.

A further advantageous embodiment provides that the drive device has a first hub part which is connected fixedly and preferably rigidly to the output shaft so as to rotate with it and a second hub part which is connected to the first hub part via the at least one bellows, it being possible for the starting element to be driven by the output shaft via the hub parts and the bellows. Here, the second hub part is coupled, for example, to the starting element, in particular is connected fixedly to the starting element so as to rotate with it. The hub parts are decoupled from one another via the bellows. The result is that oblique positions can be compensated for particularly satisfactorily with a simultaneous realization of an efficient and effective transmission of torques.

The loads which act on the output shaft can be kept particularly low if the second hub part and, via said hub part, the starting element are mounted on a housing part such that they can be rotated relative to the latter in a further embodiment of the invention. The housing part is, for example, a housing of the internal combustion engine or the drive device, the second hub part and, via said hub part, the starting element and therefore the transmission being mounted and therefore supported on the housing part at least in the radial direction. As a result, loads, that is to say, in particular, forces, can be transmitted from the starting element and the second hub part to the housing part and can therefore be supported on the housing part, with the result that excessive loads of the output shaft can be avoided despite any great lever arm length with respect to the output shaft or its bearings. In other words, a mounting of the starting element and therefore the transmission is provided on the side of the transmission by way of the mounting of the starting element and the transmission on the housing part. The result is that an additional, excessive load of the output shaft and its bearings does not occur despite the use of the drive device.

In a further refinement of the invention, an adapter shaft which is configured separately from the starting element and separately from the hub parts or is provided in addition to them is provided, which adapter shaft is coupled fixedly to the starting element so as to rotate with it and fixedly to the second hub part so as to rotate with it. A simple and advantageous assembly capability of the drive unit can be provided as a result with a simultaneous realization of an effective and efficient torque transmission, it being possible at the same time for the loads which act on the output shaft to be kept particularly low. It has been shown to be particularly advantageous here if the adapter shaft and the second hub part are coupled fixedly to one another so as to rotate together in a positively locking manner, in particular via respective spline systems. For example, the adapter is coupled to the second hub part via a positively locking shaft/hub connection which is releasable, in particular is releasable without destruction.

In order to keep the installation space requirement particularly low, furthermore, the second hub part is received at least partially in the adapter shaft. As a result, it is likewise possible, for example, to keep the spacing which runs in the axial direction between the starting element and the output shaft low. The result is that a lever arm length between the starting element and the output shaft and any resulting loads which act on the output shaft can be kept particularly low.

A further advantageous embodiment provides that the first hub part is connected fixedly to the output shaft so as to rotate with it by means of at least a first screw connection, and the adapter shaft is connected fixedly to the starting element so as to rotate with it by means of at least a second screw connection, the screw connections being arranged coaxially with respect to one another. As a result, the loads which act on the output shaft can be kept particularly low with a simultaneous realization of an effective and efficient torque transmission.

In order to keep the loads which act on the output shaft particularly low, it is provided in a further embodiment that the second hub part is connected via a second bellows to an intermediate element which is different than the bellows and the hub parts and is preferably inherently rigid, which intermediate element is connected to the first hub part via the first bellows. Two bellows increase the radial and axial movement and oblique position capability of the primary hub (first hub part) with respect to the secondary hub (second hub part) without influencing the torque transmission capability.

In order to keep the installation space requirement particularly low here, it is preferably provided that at least one length region of one of the bellows is covered in the radial direction to the outside by the other bellows. In other words, it is preferably provided that the one bellows is received at least partially in the other bellows.

The starting element preferably has a flywheel or a torsional vibration damper for damping rotational non-uniformities of the output shaft and/or a clutch and/or a torque converter. Here, the torsional vibration damper can have a dual-mass flywheel. As an alternative or in addition, it is contemplated that the torsional vibration damper has torsion springs, for example bow springs, and/or centrifugal force pendulums so as to lie on the outside or inside and/or other elements for damping rotational non-uniformities of the output shaft.

It has been shown to be advantageous, furthermore, if the drive device is configured as an electric machine, in particular an electric internal rotor machine or an electric external rotor machine. The drive device is, for example, a starter generator, by means of which the internal combustion engine can be cranked, that is to say activated or started, with driving and therefore rotation of the output shaft. Furthermore, the drive device can be configured as an electric external rotor machine which has an advantageous torque capacity.

Finally, a further embodiment provides that the drive device is a transverse drive to at least one auxiliary unit which is arranged axially parallel to the output shaft, in particular the crankshaft. Here, the transverse drive can be configured, for example, as a spur gear mechanism or a wraparound transmission. In other words, the drive device can be configured as a transverse drive to one or more auxiliary units which are arranged axially parallel to the output shaft. An auxiliary unit of this type is, for example, a refrigerant compressor or an electric machine, in particular an axially parallel electric machine, or another machine.

A motor vehicle, in particular a passenger car, having a drive device according to the invention also is within the scope of the invention. Here, advantageous refinements of the drive device according to the invention are to be considered to be advantageous refinements of the motor vehicle according to the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical or functionally identical elements are provided with identical designations.

DETAILED DESCRIPTION OF THE DRAWINGS

Figure 1:
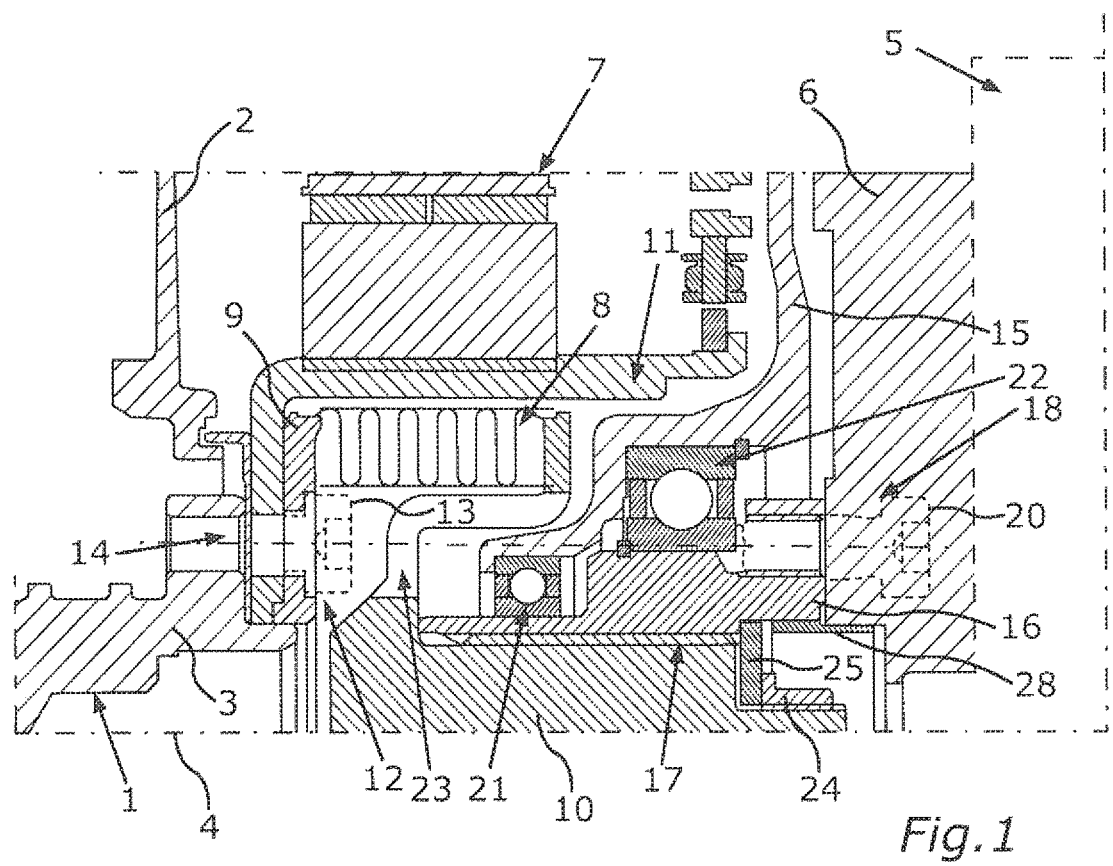
FIG. 1 shows details of a diagrammatic longitudinal sectional view of a first embodiment of a drive unit for a motor vehicle, with an internal combustion engine which has an output shaft, with a starting element which can be driven by the output shaft, and with a transmission which can be driven by the output shaft via the starting element, at least one bellows being provided, via which the starting element can be driven by the output shaft.

FIG. 1 shows details of a diagrammatic longitudinal sectional view of a drive unit for a motor vehicle, in particular a passenger car. The drive unit includes an internal combustion engine which can be seen in details in FIG. 1, is denoted overall by 1, and is configured in the present case as a reciprocating piston internal combustion engine. Here, FIG. 1 shows the drive unit in accordance with a first embodiment. At least two wheels of at least one axle of the motor vehicle can be driven by means of the internal combustion engine 1, the motor vehicle in the present case comprising at least two axles which are arranged behind one another in the vehicle longitudinal direction with in each case at least two wheels.

The internal combustion engine 1 has a crankcase 2 which can be seen only in details in FIG. 1, and an output shaft in the form of a crankshaft 3 which can be seen in details in FIG. 1. The crankshaft 3 is mounted on the crankcase 2 such that it can be rotated about a rotational axis 4 relative to the crankcase 2.

Furthermore, the internal combustion engine 1 has a plurality of combustion chambers in the form of cylinders, in which in each case one piston is received such that it can move translationally. The pistons are connected in an articulated manner to the crankshaft 1 via respective connecting rods, with the result that translational movements of the pistons are converted into a rotational movement of the crankshaft 3. Here, the crankshaft 3 is mounted on the crankcase 2 via respective bearings, said bearings also being called main bearings and being arranged so as to follow one another in the axial direction of the crankshaft 3 or behind one another. The internal combustion engine 1 provides torques via the crankshaft 3, by means of which torques the wheels and therefore the motor vehicle overall are driven.

Furthermore, the drive unit includes a transmission 5 (shown merely very diagrammatically in FIG. 1) which is utilized to adapt the rotational speed of the crankshaft 3 or the internal combustion engine 1 to the speed, in order, for example, to allow the internal combustion engine 1 to operate in a favorable power range as a result. In other words, the transmission 5 is an apparatus for converting the characteristic of the internal combustion engine 1. The transmission 5 can be configured, for example, as a manual transmission, in particular a manual gearbox, an automated manual gearbox, an automatic transmission, in particular an automatic transmission which is based on a planetary transmission, a double clutch transmission, a continuously variable transmission or another transmission.

Furthermore, the drive unit includes a starting element 6 which can be driven by the crankshaft 3, it being possible for the transmission 5 to be driven by the crankshaft 3 (output shaft) via the starting element 6. The starting element 6 includes, for example, a flywheel, in particular a dual mass flywheel. Furthermore, the starting element 6 can have a torsional vibration damper, in particular a dual mass flywheel, rotational non-uniformities and vibrations of the crankshaft 3 being damped by means of the torsional vibration damper. The torsional vibration damper is also called a rotational non-uniformity system, since rotational non-uniformities of the output shaft can be damped by means of the torsional vibration damper. Furthermore, the starting element 6 can include an, in particular, hydrodynamic torque converter or a clutch, in particular a clutch of a double clutch transmission.

Furthermore, the drive unit has a drive device which is different from the internal combustion engine 1, from the starting element 6 and from the transmission 5, in the form of an electric machine which is denoted overall by 7 and is configured as a starter generator in the present case. The starter generator is also called a crankshaft starter generator and has a housing which cannot be seen in FIG. 1 and a stator which cannot be seen in FIG. 1. The crankshaft 3, the transmission 5 and the starting element 6 are arranged coaxially with respect to one another, and it is possible for them to be rotated about the rotational axis 4 relative to the housing and therefore the stator of the starter generator. The stator of the starter generator is namely fixed on the housing. The transmission 5 includes, for example, a transmission housing, the housing of the starter generator being an intermediate housing which is arranged, for example, in the axial direction between the crankcase 2 and the transmission housing.

Furthermore, the starter generator includes a rotor which can be rotated about the rotational axis 4 relative to the stator. Here, the electric machine 7 is configured as an internal rotor machine or internal rotor motor, with the result that the rotor is arranged in the radial direction at least partially within the stator. Here, the rotor can be driven by the stator. The preceding and following comments can also readily be transferred, however, to external rotor machines or electric external rotor machines, in which the rotor is arranged outside the stator.

That one of the main bearings which is arranged in the axial direction of the crankshaft 3 closest to the starting element 6 and therefore to the starter generator is also called the last main bearing. In order to then keep the loads which act on the crankshaft 3, in particular in the region of the last main bearing, particularly low, the drive unit in accordance with the first embodiment comprises a bellows 8, via which the starting element 6 can be driven by the crankshaft 3. In the present case, the bellows 8 is formed from a metallic material, with the result that the bellows 8 is configured as a metal bellows. The metal bellows acts as a metal bellow coupling or balancing clutch, by which axial and radial movements or oblique positions of the starting element 6 with respect to the crankshaft 3 can be compensated for. Furthermore, the bellows 8 makes an effective and an efficient torque transmission possible, with the result that torques can be transmitted particularly effectively and efficiently between the starting element 6 or the transmission 5 and the crankshaft 3.

The torsionally rigid connection between the starter generator and the crankshaft 3 makes it possible that the starter generator per se has the possibility of damping or reducing the torsional vibrations of the crankshaft 3 via a correspondingly counter-phase generation of torque. Even if it should not be appropriate in energy terms in all operating ranges, there would be the possibility as a result to assist the rotational non-uniformity system, that is to say the torsional vibration damper of the starting element 6.

The rotor of the starter generator (electric machine 7) comprises an inherently rigid first hub part in the form of a primary hub 9 which is connected fixedly and in the present case rigidly to the crankshaft 3 so as to rotate with it, and a second hub part in the form of a secondary hub 10 which is connected via the bellows 8 to the first hub part (primary hub 9) and is likewise of inherently rigid configuration. Therefore, the starting element 6 and the transmission 5 can be driven via the hub parts (primary hub 9 and secondary hub 10) and the bellows 8, since the secondary hub 10 is connected or coupled, in particular, fixedly to the primary hub 9 so as to rotate with it via the bellows 8.

Furthermore, the rotor comprises a rotor hub 11 which is connected fixedly to the primary hub 9 and the crankshaft 3 so as to rotate with them. It can be seen from FIG. 1 that the primary hub 9 and the rotor hub 11 are flange-connected to the crankshaft 3. Here, the primary hub 9 and the rotor hub 11 are connected fixedly to the crankshaft 3 so as to rotate with it by means of screw connections, it being possible to see a screw connection denoted by 12 of said screw connections in FIG. 1. The screw connection 12 comprises a bolt 13 which is shown by way of a dashed line in FIG. 1, and corresponding screw openings 14, configured, for example, as through openings, of the primary hub 9, the rotor hub 11 and the crankshaft 3. For example, the primary hub 9 and the rotor hub 11 are connected in a non-positive manner to the crankshaft 3 by means of the screw connections which are also called first screw connections.

Details of a bearing plate 15 of the electric machine 7 can be seen in FIG. 1. The bearing plate 15 is a housing part of the intermediate housing, that is to say of the housing part of the electric machine 7, the secondary hub 10 being mounted at least indirectly on the bearing plate 15 such that it can be rotated about the rotational axis 4 relative to the bearing plate 15. Here, the drive device comprises an adapter shaft 16 which is configured separately from the starting element 6 and separately from the hub parts and is connected fixedly to the starting element 6 so as to rotate with it and fixedly to the secondary hub 10 so as to rotate with it.

To this end, the secondary hub 10 and the adapter shaft 16 have respective spline systems 17 which are in mutual engagement. Therefore, the spline systems 17 interact in a positively locking manner, as a result of which the adapter shaft 16 is connected or coupled fixedly to the secondary hub 10 so as to rotate with it. This means that torques can be transmitted between the secondary hub 10 and the adapter shaft 16. The adapter shaft 16 is connected fixedly to the starting element 6 so as to rotate with it by means of second screw connections, with the result that torques can also be transmitted between the starting element 6 and the adapter shaft 16. Of said second screw connections, one screw connection which is denoted by 18 can be seen in FIG. 1, the second screw connection 18 comprising a bolt 20 which is illustrated by way of dashed lines in FIG. 1, and screw openings, for example, of the starting element 6 and the adapter shaft 16. The first screw connections or their screw openings form a first hole circle with a first diameter, the second screw connections or their screw openings forming a second hole circle with a second diameter. The first hole circle or the first diameter preferably corresponds to the second hole circle or the second diameter, with the result that, as can be seen from FIG. 1, the screw connection 12 is arranged coaxially with respect to the screw connection 18.

Transferring the flange pattern from the crankshaft 3 to the adapter shaft 16 also has the advantage that the connection dimensions for the starting element 6 for drive units with or without a starter generator or an auxiliary unit transverse drive do not change. A corresponding kit for the starting element 6 is therefore retained.

Via the adapter shaft 16, for example, the secondary hub 10 is mounted in the radial direction on the bearing plate 15 such that it can be rotated about the rotational axis 4 relative to the bearing plate 15. Here, the bearing plate 15 is preferably mounted on the intermediate housing in a centered manner. In order to mount the adapter shaft 16 on the bearing plate 15, bearings 21 and 22 are provided which are arranged behind one another in the axial direction or following one another. In the present case, the bearings 21 and 22 are configured as anti-friction bearings, in particular ball bearings, the bearing 21 being configured as a floating bearing and the bearing 22 being configured as a locating bearing. The rotor hub 11 or the secondary hub 10 has a mounting opening 23, with the result that particularly simple mounting of the drive unit can be realized.

It can be seen from FIG. 1 that the adapter shaft 16 is configured as a hollow shaft at least in one length region, the secondary hub 10 being arranged at least partially in the length region. In other words, at least one length region of the secondary hub 10 is received in the adapter shaft 16, with the result that the adapter shaft is arranged at least partially on the secondary hub 10.

In order to fix the adapter shaft 16 on the secondary hub 10 in the axial direction, a nut in the form of a shaft nut 24 and an intermediate shim 25 which is arranged in the axial direction between the shaft nut 24 and the secondary hub 10 are used, the adapter shaft 16 being tensioned in the axial direction against the secondary hub 10 by means of the shaft nut 24 via the intermediate shim 25. To this end, the shaft nut 24 is screwed onto the secondary hub 10, in particular onto a corresponding thread of the secondary hub 10, and is tightened. Moreover, a centering ring 28 is provided which is pressed in, for example, after the mounting of the intermediate shim 25. By means of the centering ring 28, for example, the adapter shaft 16 is centered with respect to the starting element 6 or the transmission 5.

It can be seen overall from FIG. 1 that the crankshaft 3 can be driven by the electric machine 7, in particular in a motor operation of the electric machine 7, as a result of which the internal combustion engine 1 can be cranked or started, that is to say can be activated. In order to start the internal combustion engine 1, the torques are transmitted from the electric machine 7 to the crankshaft 3. Furthermore, it is contemplated to operate the electric machine 7 in a generator operation, in which the electric machine 7 or its rotor is driven by the crankshaft 3. Here, torques are transmitted from the crankshaft 3 to the rotor, with the result that mechanical energy which is provided by the crankshaft 3 can be converted into electric energy by means of the electric machine 7 and can be stored, for example, in a battery.

As a result of the use of the starter generator, the starting element 6 is at a relatively great axial spacing from the crankshaft 3. Despite said great spacing and a resulting, great lever arm length, excessive loads of the crankshaft 3 can be avoided, since a balancing clutch in the form of a metal bellow coupling is provided by way of the metal bellows. Furthermore, the transmission 5 including the starting element 6 which has, for example, a torsional damping system is mounted on the bearing plate 15, with the result that a separate mounting of the transmission 5 including the starting element 6 is provided. Via the metal bellow coupling, all unfiltered torques can be transmitted in as torsionally rigid a manner as possible to the starting element 6, in particular its input side. In the present case, the rotor hub 11 and the primary hub 9 are configured as components which are configured separately from one another and are connected to one another, in particular are connected to one another fixedly so as to rotate together. It is contemplated, for example, that the rotor hub 11 and the primary hub 9 are configured in one piece with one another. In the first embodiment, precisely one bellows is provided, via which the starting element 6 is coupled to the crankshaft 3. A simple metal bellow coupling is formed as a result.

Figure 2:
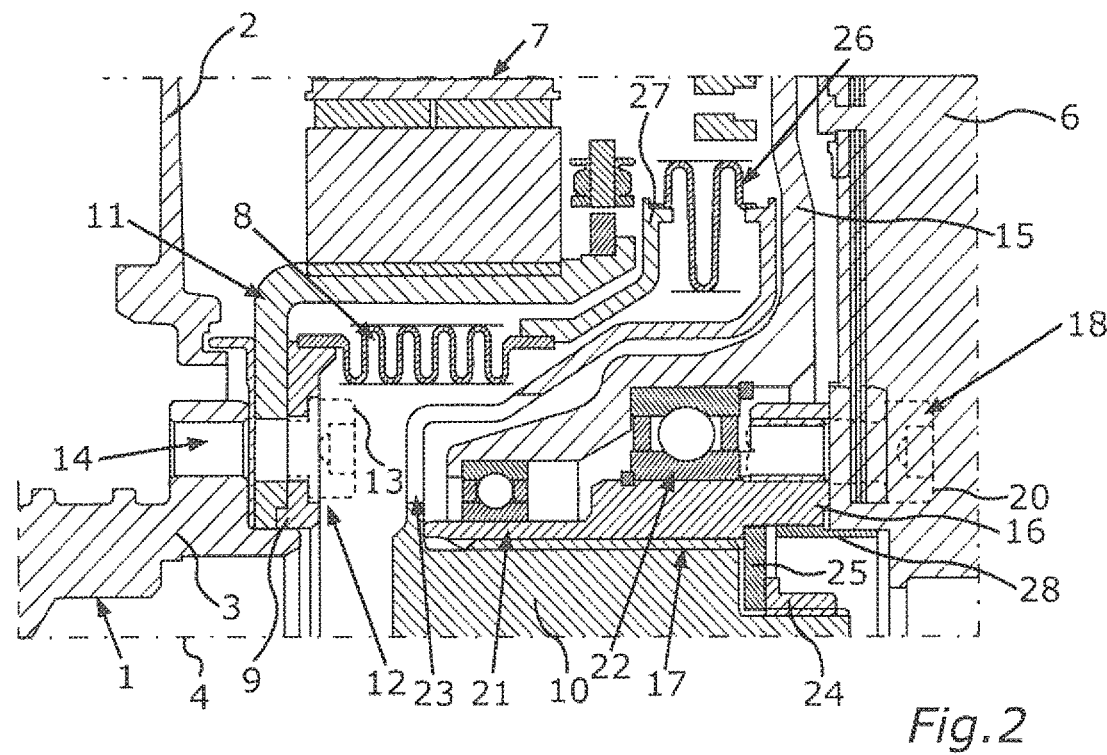
FIG. 2 shows details of a diagrammatic longitudinal sectional view of a second embodiment of the drive unit.

FIG. 2 shows a diagrammatic longitudinal sectional view of a second embodiment of the drive unit 7, a double bellow coupling or a double metal bellow coupling being provided as a balancing clutch. In the second embodiment, the bellows 8 which is configured as a metal bellows is provided as a primary bellows, and a second bellows 26 is provided as a secondary bellows. The secondary bellows is also produced from a metallic material and is therefore configured as a metal bellows. Furthermore, an inherently rigid intermediate element 27 which is connected to the two bellows 8 and 26 is provided in the second embodiment. Therefore, the secondary hub 10 is connected to the first bellows 8 via the second bellows 26 and the intermediate element 27, with the result that the starting element 6 can be driven by the crankshaft 3 via the adapter shaft 16, the secondary hub 10, the second bellows 26, the intermediate element 27 and the first bellows 8.

Figure 3:
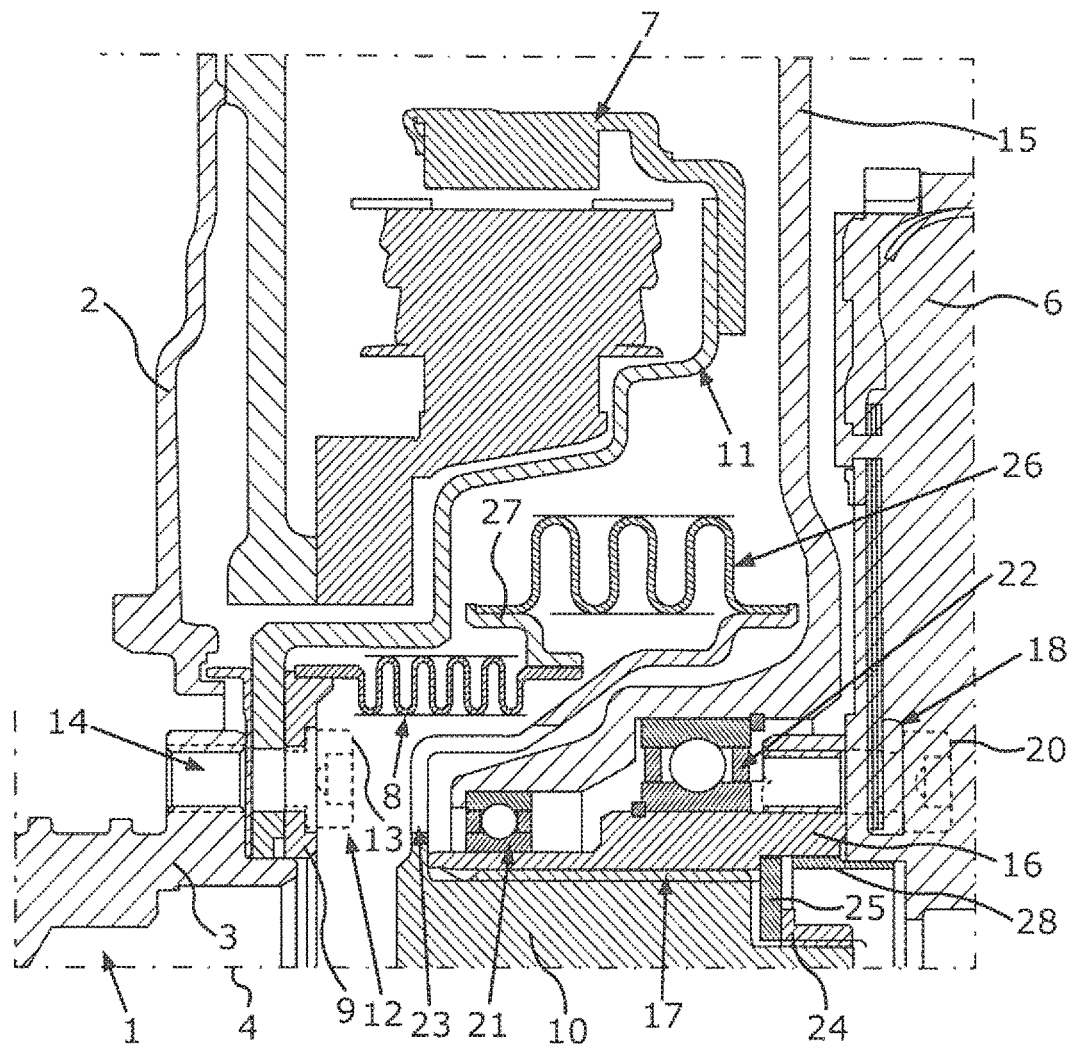
FIG. 3 shows details of a diagrammatic longitudinal sectional view of a third embodiment of the drive unit.

FIG. 3 shows a third embodiment of the drive unit 7, the installation space requirement of which can be kept particularly low. It is provided in the third embodiment that at least one length region of the first bellows 8 is covered in the radial direction toward the outside by the second bellows 26. Furthermore, at least one length region of the first bellows 8 is covered in the radial direction toward the outside by the intermediate element 27, with the result that the first bellows 8 is received at least partially in the intermediate element 27 and the second bellows 26. Therefore, a double metal bellows coupling, the installation space requirement of which can be kept particularly low, is also formed in the third embodiment.

LIST OF DESIGNATIONS

1 Internal combustion engine
2 Crankcase
3 Crankshaft
4 Rotational axis
5 Transmission
6 Starting element
7 Electric machine
8 Bellows
9 Primary hub
10 Secondary hub
11 Rotor hub
12 Screw connection
13 Bolt
14 Screw openings
15 Bearing plate
16 Adapter shaft
17 Spline systems
18 Screw connection
20 Bolt
21 Bearing
22 Bearing
23 Mounting opening
24 Shaft nut
25 Intermediate shim
26 Second bellows
27 Intermediate element
28 Centering ring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit for a motor vehicle, comprising:
   at least one internal combustion engine which has an output shaft;
   at least one starting element which is drivable by the output shaft;
   a transmission which is drivable by the output shaft via the starting element;
   at least one bellows via which the starting element is drivable by the output shaft; and
   a drive device which is different than the internal combustion engine, wherein
   the starting element is drivable by the drive device via the at least one bellows, and the output shaft is drivable via the drive device,
   the drive device comprises a first hub part which is connected fixedly to the output shaft so as to rotate with it and a second hub part which is connected via the at least one bellows to the first hub part, and
   the starting element is driven by the output shaft via the first and second hub parts and the bellows.

2. The drive unit as claimed in claim 1, wherein the bellows is formed from a metallic material.

3. The drive unit as claimed in claim 1, wherein
   the second hub part and, via said second hub part, the starting element are mounted on a housing part such that they can be rotated relative to the latter.

4. The drive unit as claimed in claim 3, further comprising:
   an adapter shaft which is configured separately from the starting element and separately from the first and second hub parts, which adapter shaft is coupled fixedly to the starting element so as to rotate with it and fixedly to the second hub part so as to rotate with it.

5. The drive unit as claimed in claim 4, wherein
   the adapter shaft and the second hub part are connected fixedly to one another so as to rotate together in a positively locking manner.

6. The drive unit as claimed in claim 5, wherein the positively locking manner is carried out via respective spline systems.

7. The drive unit as claimed in claim 5, wherein the second hub part is received at least partially in the adapter shaft.

8. The drive unit as claimed in claim 4, wherein the second hub part is received at least partially in the adapter shaft.

9. The drive unit as claimed in claim 4, wherein
the first hub part is connected fixedly to the output shaft so as to rotate with it by way of at least a first screw connection, and
the adapter shaft is connected fixedly to the starting element so as to rotate with it by way of at least a second screw connection, the first and second screw connections being arranged coaxially with respect to one another.

10. The drive unit as claimed in claim 1, further comprising:
an adapter shaft which is configured separately from the starting element and separately from the first and second hub parts, which adapter shaft is coupled fixedly to the starting element so as to rotate with it and fixedly to the second hub part so as to rotate with it.

11. The drive unit as claimed in claim 1, wherein
the second hub part is connected via a second bellows to an intermediate element, which intermediate element is different than the first and second bellows and the hub parts and is connected via the first bellows to the first hub part.

12. The drive unit as claimed in claim 11, wherein
at least one length region of one of the bellows is covered in the radial direction toward the outside by way of the other bellows.

13. The drive unit as claimed in claim 1, wherein
the starting element has a flywheel for damping rotational non-uniformities of the output shaft.

14. The drive unit as claimed in claim 1, wherein the drive device is configured as an electric machine.

15. The drive unit as claimed in claim 14, wherein
the electric machine is an electric internal rotor machine.

* * * * *